Aug. 13, 1929.    F. W. SPRINGER    1,724,528
THERMOMETER
Filed March 7, 1919    2 Sheets-Sheet 1
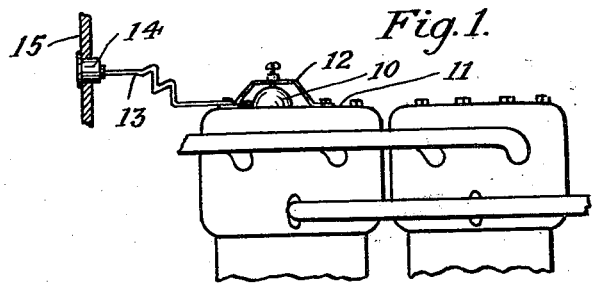
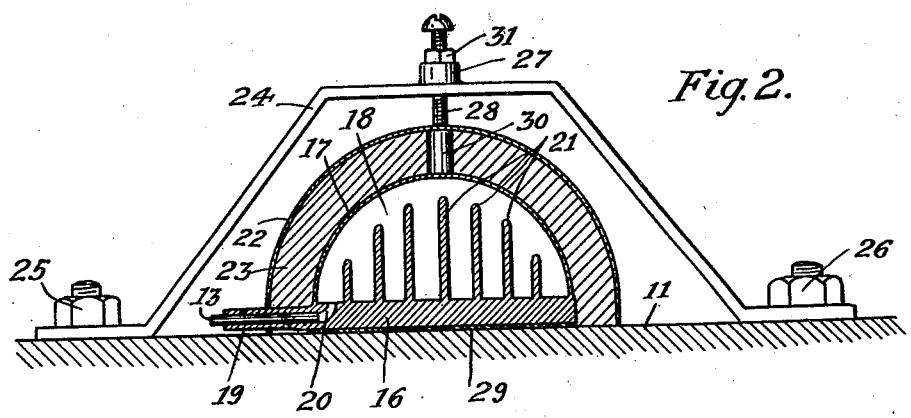
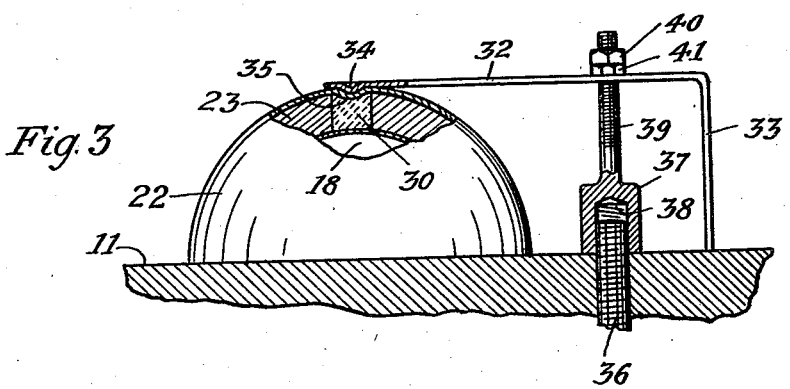
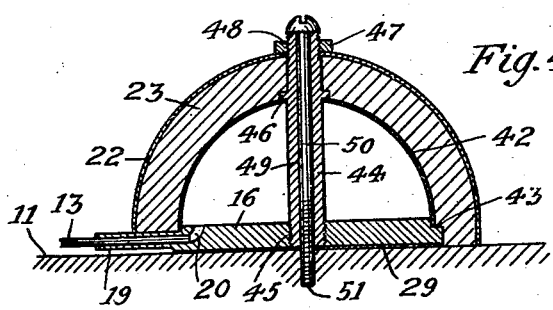
*Inventor:*
Franklin Wesley Springer

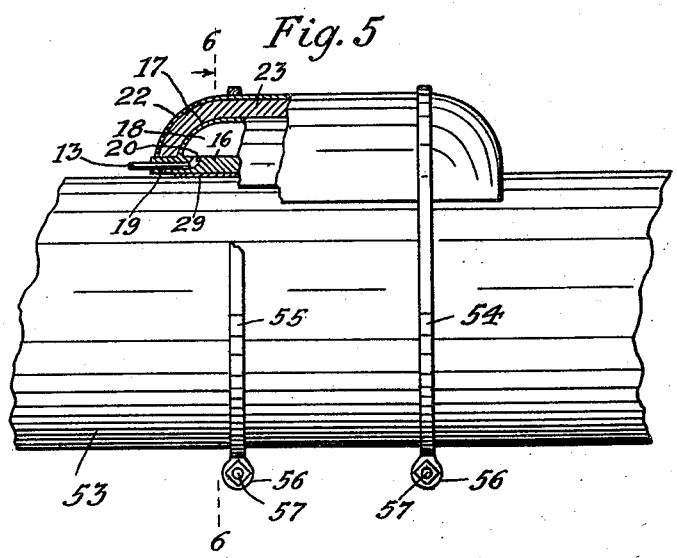
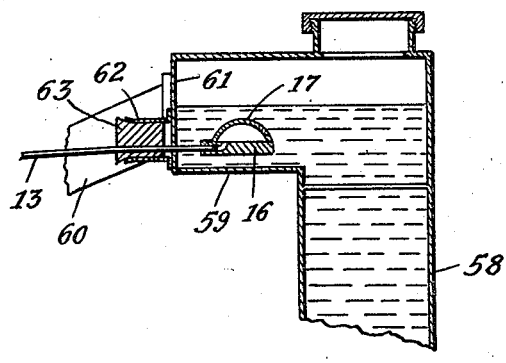
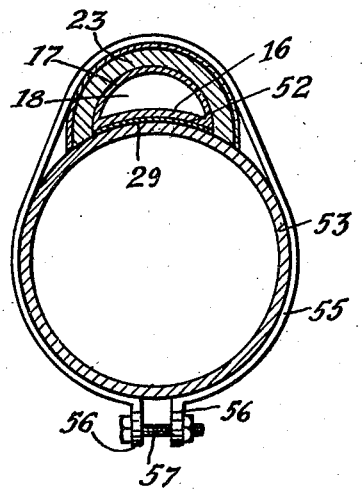

Patented Aug. 13, 1929.

1,724,528

UNITED STATES PATENT OFFICE.

FRANKLIN WESLEY SPRINGER, OF MINNEAPOLIS, MINNESOTA, ASSIGNOR TO THE MOTOMETER COMPANY, INC., OF LONG ISLAND CITY, NEW YORK, A CORPORATION OF NEW YORK.

THERMOMETER.

Application filed March 7, 1919. Serial No. 281,232.

My invention relates to thermometers and has for its object to provide a volatile liquid, or gas, thermometer adapted to be applied directly to the surface whose temperature is to be measured and with the indicating device remotely positioned from the temperature element. In carrying out the objects of my invention I employ a temperature element comprising a plate adapted to fit or engage the surface whose temperature is to be measured, with a cup-shaped member secured thereon and forming an expansion chamber for the gas and also an insulating and protecting cover held in place by means of a clamp which also holds the whole device in place upon the surface just mentioned.

The full objects and advantages of my invention will be found in the detailed description thereof and are particularly pointed out in the claims.

In the figures illustrating my invention in more than one form: Fig. 1 is a view of a portion of a motor vehicle showing the application of my invention thereto for measuring the temperature of the cylinder head. Fig. 2 is a cross sectional view of the temperature element drawn to a larger scale. Figs. 3 and 4 are similar views showing modifications of the invention. Fig. 5 is a still different form of the invention. Fig. 6 is a section taken on line 6—6 of Fig. 5. Fig. 7 is a view showing a different method of using my invention.

My invention as shown in Fig. 1 comprises a temperature element 10 which may be secured to a surface 11 whose temperature is to be measured by means of a clamp 12 and is connected by a small tube 13 to a pressure gauge 14. The interiors of member 10, tube 13 and gauge 14 are filled with an expansible gas, due to the pressure of a volatile liquid, which, as member 10 becomes heated, expands and operates the gauge, which may be calibrated to indicate the temperature at the surface 11. In this application the gauge is shown mounted on the dash 15 of the vehicle where the driver can observe the same.

The construction of the temperature element 10 shown in detail in Fig. 2 is as follows: A circular plate or heat conducting member 16 is provided which on its under side is constructed to fit or engage the surface 11 whose temperature is to be measured. In this case surface 11 being the top of the cylinder head the same may be flat as shown. Upon the upper part of the plate 16 is formed a cup-shaped shell member 17 preferably hemispherical which provides a hollow chamber 18 in which the expansible gas is placed. Along the lower edge of plate 16 is cast a stem 19 which has a hole 20 thru it communicating with the interior of chamber 18. Tube 13 as shown is inserted in this stem and soldered in place. To conduct the heat to all portions of chamber 18 as quickly as possible a number of fins 21 are provided which are cast integral with the plate 16. This has the effect of causing the thermometer to act more quickly and to make the operation more uniform.

To prevent loss of heat from the cup-shaped member 17, and to protect it from physical damage, a concentric shell 22 is provided which is filled with some heat insulating material 23 and placed directly over member 17 completely enclosing it and covering it and covering all portions of the temperature element except the plate 16 thru which the heat is conducted to the gas. The insulating portion 23 is preferably made to hold its own shape and may be glued or cemented to the shell 22 so that said shell and insulation may be simultaneously removed if desired.

In applying the temperature element to the object whose temperature is to be measured the clamp 12 is employed. The form shown in Fig. 2 comprises a U shaped clamp member 24 which is so designed as to fit under two of the existing stud nuts 25 and 26 of the cylinder head. The clamp member 44 forms part of the clamp designated in its entirety in Fig. 1 by the character 12. On the top of this clamp member is formed a boss 27 which is threaded to receive a screw 28. In applying the device the member 16 is first coated on its contact surface with a heat conducting paste such as that formed of some "lead" compound or of graphite. Insulator 23 is then replaced and the whole firmly pressed on the required surface directly beneath the screw 28 to exclude all air from the contact joint which is clearly indicated at 29. Within shell 22 directly beneath screw 28 is a piece of cork 30 which bears directly upon the top of member 17. As screw 28 is tightened pressure is exerted thru cork 30 upon member 22 which firmly holds the entire device in place. A lock nut 31 may be employed to prevent screw 28 from rotating.

The temperature element shown in Fig. 3 differs only from that shown in Fig. 2 by the particular type of clamp employed to hold the same in place. Here a bar 32 having a leg 33 bent at right angles to it is used in place of the U-shaped clamp 24. One end of bar 32 is indented at 34 to fit into a corresponding recess 35 in shell 22 to prevent it from sliding while the other end of said clamp rests directly upon the surface 11. In this case also, the clamp is secured to the cylinder head by means of one of the stud bolts 36. A hexagonal member 37 is internally threaded at 38 to screw upon the end of stud 36 and takes the place of the nut originally provided for that purpose. The extreme end of member 37 is turned down to form a small threaded spindle 39 which passes through the clamp 32. By means of a pair of nuts 40 and 41 the clamp 32 can be made to bear with any pressure upon the shell 22 and nut 41 can be held from rotating.

The temperature element shown in Fig. 4 has the volatile liquid and gas containing chamber made in two portions and differs in the manner of holding the parts together and of clamping to the required surface. Plate 16 and connecting stem 19 are cast in one piece while the cup-shaped cover member is formed separate by spinning as indicated at 42 and is set into a recess 43 formed around the edge of plate 16. A spindle 44 is threaded at one end, and screws into the center of plate 16 at 45. This spindle passes thru member 42 and has a shoulder 46 on it which engages the top of member 42 and holds it in place in recess 43 as said spindle is screwed into plate 16 at 45. In a similar manner said spindle also passes thru shell 22 and insulation 23 while a nut 47 screwed upon the other end of said spindle at 48 holds said shell and insulation in place. The manner of clamping the device on the surface 11 is as follows: Spindle 44 is made with a longitudinal bore 49 which extends thruout the length of same. A screw 50 passes thru this bore and is screwed into a hole 51 which may be drilled and tapped wherever the device is to be attached.

A still different form of the invention is shown in Figs. 5 and 6. This temperature element is designed to be attached to a pipe or other curved surface. The construction is practically the same as that shown in Fig. 1 except that the contact surface 52 is curved to fit or engage the surface of a pipe 53 to which it is shown fastened. Also the entire member is shown elongated as is indicated in Fig. 5 to present sufficient area for the proper transmission of heat. The manner of attaching the device differs from the other forms. A pair of looped wire or strap like members 54 and 55 is provided which extend completely around both the temperature element and pipe 53. The ends of these wire members are formed into eyes 56 thru which bolts 57 extend. When these bolts are tightened the temperature element is tightly drawn against pipe 53.

To show the wide range of methods in which my invention may be used the same is shown as immersed in a motor vehicle radiator in Fig. 7. An ordinary radiator 58 is shown with a storage reservoir 59 and hose connection 60 leading therefrom. The rear wall 61 of reservoir 59 is provided with a tubular neck 62 soldered thereto. The insulating member 23 and shell 22 are removed from the temperature element proper and a split cork 63 fitted around tube 13, said cork being of a proper size to fit into neck 62. Upon passing members 17 and 16 thru neck 62 and applying cork 63 the thermometer may be employed as an immersed type as is clearly shown in Fig. 7.

The advantages of my invention are manifest. The thermometer can be applied directly to the surface whose temperature is to be measured or it may be used as an immersed type of thermometer. When employed on motor vehicles the indicating mechanism may be mounted on the dash so that the driver may at all times while driving the car be properly informed as to the temperature of his engine.

I claim:

1. A thermometer comprising a heat conducting member constructed to fit upon the outer surface of an object whose temperature is to be measured, a plastic heat conductor interposed between said member and said object whereby air is excluded from the contact joint, means for holding said member against said object, a shell member upon the outer surface of said heat conducting member and forming therewith a chamber adapted to contain an expansible fluid, a pressure gauge for indicating temperatures, and a tube connecting said chamber with said pressure gauge.

2. A thermometer comprising a heat conducting member constructed to fit upon the outer surface of an object whose temperature is to be measured, means for holding said member in intimate contact with said object, a plurality of fins upon the outer surface of said heat conducting member, a shell member upon the outer surface of said heat conducting member and forming therewith a chamber adapted to contain an expansible fluid, a pressure gauge for indicating temperatures, and a tube connecting said chamber with said pressure gauge.

3. A thermometer comprising a heat conducting member constructed to fit upon the outer surface of an automobile engine, a clamp for holding said member in intimate contact with said surface, said clamp being adapted to be secured by means of the customary stud fastenings on the engine, a shell member upon the outer surface of said heat conducting member and forming therewith a chamber adapted to contain an expansible fluid, a pressure gauge for indicating temperatures adapted to be mounted on the dash of the automobile, and a tube connecting said chamber with said pressure gauge.

4. A thermometer comprising a heat conducting base member, a cup shaped shell member upon one surface of said base member and forming therewith a chamber adapted to contain an expansible fluid, said base member being provided with a hole extending from its periphery and leading into the interior of said chamber, a temperature indicator, and a tube connecting said chamber with said indicator.

5. A thermometer comprising a heat conducting member constructed to fit upon the outer surface of an object whose temperature is to be measured, a shell member upon the outer surface of said heat conducting member and forming therewith a chamber adapted to contain an expansible fluid, a pressure finger engaging said shell member to hold the same on said surface, a temperature indicator, and a tube connecting said chamber with said indicator.

6. A device of the class described comprising a thermo-sensitive member, constructed to engage the outer surface of an engine, a plastic heat conductor interposed between said member and said surface whereby air is excluded from the contact joint, means for holding said member against said surface, a temperature indicator adapted to be mounted in view of the operator, a tube connecting said thermo-sensitive-member and said indicator, and means in said tube for actuating said indicator from said thermo-sensitive-member.

FRANKLIN WESLEY SPRINGER.